April 18, 1933.　　　　C. B. SMITH　　　　1,904,093
LICENSE PLATE FOR MOTOR VEHICLES
Filed Feb. 15, 1932
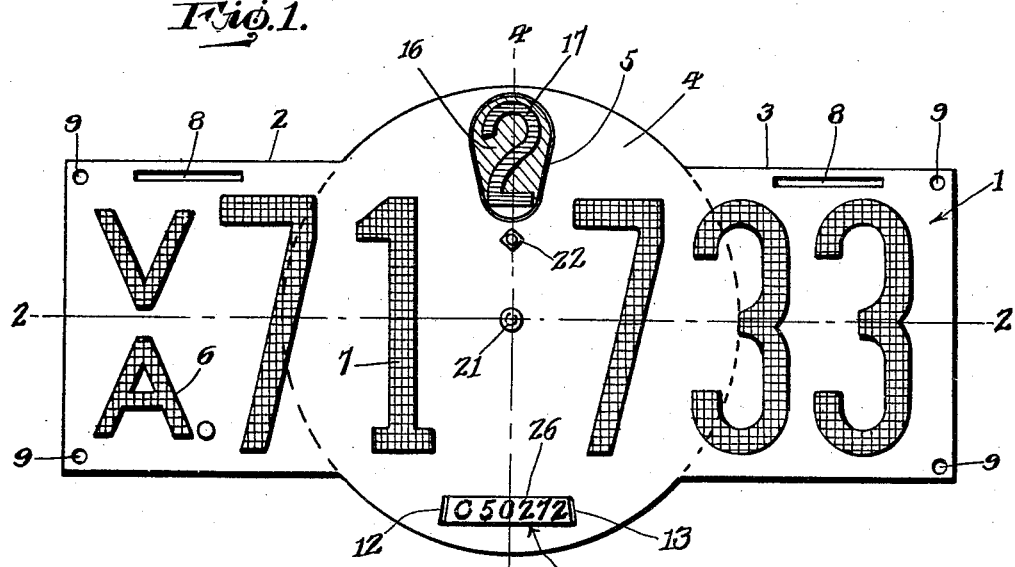
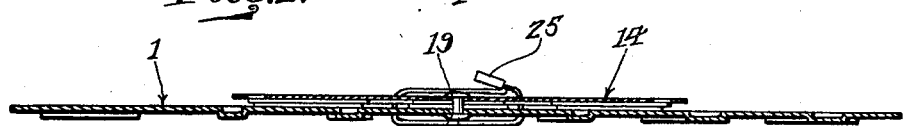
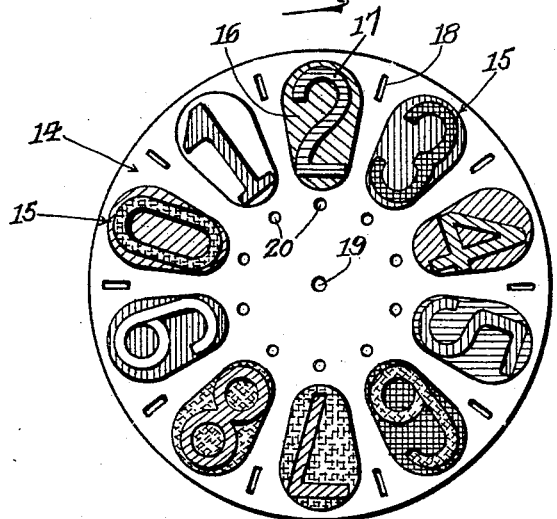
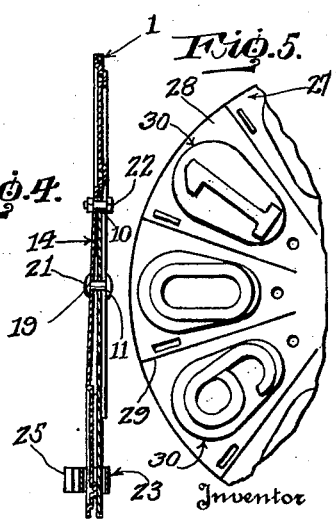
Inventor
Conway B. Smith
By
Geo. P. Kimmel
Attorney Patented Apr. 18, 1933

1,904,093

UNITED STATES PATENT OFFICE

CONWAY B. SMITH, OF PORTSMOUTH, VIRGINIA

LICENSE PLATE FOR MOTOR VEHICLES

Application filed February 15, 1932. Serial No. 593,138.

This invention relates to improvements in license or identification plates for use upon motor vehicles, and has for its object to provide, in a manner as hereinafter set forth, a plate of such class so constructed and arranged to enable it to be used for successive given periods of time thereby overcoming the necessity of issuing a new plate at the expiration of each period of time for which a license plate is issued.

A further object of the invention is to provide, in a manner as hereinafter set forth, a plate of the class referred to including a permanent license number and shiftable means independent of the license number for indicating successive years or given periods of time for which the plate may be issued thereby enabling it to be employed for a number of years or given periods of time without changing the license number thereon.

A further object of the invention is to provide, in a manner as hereinafter set forth, a plate of the class referred to, capable of being used for successive years or given periods of time and including a revoluble carrier formed with successively exposable divisions, each provided with means to designate a period of time for which the plate is issued, with the divisions differently colored with respect to each other, and with each division of a color different from the designating means provided thereon.

A further object of the invention is to provide, in a manner as hereinafter set forth, a plate of the class and for the purpose referred to having an opening common to and for successively exposing different periods of time for designating the period of time for which the plate is licensed for use, and with each indication so formed as to extend into and be encompassed by the wall of said opening to have a part of the indicator flush with the outer face of the plate.

A further object of the invention is to provide, in a manner as hereinafter set forth, a plate of the class and for the purpose referred to with a revoluble carrier provided with successively exposable different periods of time indicators, and a retaining element coacting with the plate body for latching the carrier from movement and with said element being in the form of an identifiable seal for use only during that selected period of time as designated by the exposed indicator.

A further object of the invention is to provide, in a manner as hereinafter set forth, a plate of the class and for the purpose referred to having an opening common to a set of time period indicators, each for selectable exposure by and for extension into said opening, and means for securing a selected indicator in such opening.

Further objects of the invention are to provide, in a manner as hereinafter set forth, a license plate of the class and for the purpose referred to, which is simple in its construction, strong, durable, compact, thoroughly efficient in its use, and comparatively inexpensive to manufacture.

To the above ends essentially and others which may hereinafter appear, the invention consists of such parts and such combination of parts which fall within the scope of the invention as claimed.

In the drawing:

Figure 1 is a front elevation of a license plate in accordance with this invention.

Figure 2 is a section on line 2—2 Figure 1.

Figure 3 is an elevation of the yearly indicators carrier looking toward that face of the latter provided with the indicators.

Figure 4 is a section line 4—4 Figure 1.

Figure 5 is a fragmentary view in elevation of a modified form of yearly indicators carrier looking toward that face thereof provided with the indicators.

The plate referred to generally at 1 is formed of a pair of outer portions 2, 3 and an intermediate portion 4, the latter being materially larger than the portions 2, 3 to extend beyond the top and bottom edges of the latter. The portion 4 can be of any suitable contour and is illustrated by way of example as circular. The portion 4 is formed with an enlarged exposure opening which is common to a set of yearly indicators for selective exposure through such opening to set forth the period of time or the year for which the plate is licensed for use. The exposure opening may be of any suitable shape and arranged at the top or bottom of portion 4, and in the embodiment of the invention as shown, the opening, indicated at 5 is of flared contour and is arranged at the vertical median and in the upper part of portion 4.

The plate 1 is embossed to provide on its front face an indication to designate the state, county or district issuing the plate and in the example shown the indication designates a state, as at 6. The plate 1 is also embossed to provide on its front face the license number as at 7. The end portions 2, 3 are formed with slots 8 and apertures 9 for the passage of holdfast means to secure it to the automobile. The intermediate portion 4, at the vertical median thereof is provided with spaced, superposed openings 10, 11, the latter being arranged at the axis of said portion 4. Below the opening 11, and in proximity to the bottom edge of portion 4, the latter is formed with a pair of spaced, opposed slots 12, 13 and with respect to the latter, if the opening 5 is in the lower part of portion 4, then the slots 10, 11 will be arranged in proximity to the upper edge of such portion.

With reference to Figures 1, 2 and 4, there is positioned at the rear of the portion 4 of plate 1 a revoluble carrier 14 of the disc like form. The carrier 14 with reference to Figure 3 is formed with a series of spaced divisions arranged in a circular row. Each division includes a pair of embossed parts extended forwardly from the body of the carrier. Each division provides a yearly or period of time indicator to designate the year or period of time that the plate is licensed for use. The divisions are radially disposed with their outer ends in proximity to the outer edge of the carrier. The divisions are generally indicated at 15. Each division includes a colored inner or base part 16 corresponding in contour to that of opening 5 and of an area capable of entering the latter and be encompassed by the wall of opening 5. Each division also includes a colored outer part 17 which is embossed on the part 16 of the division and extends forwardly therefrom. The divisions are ten in number and the outer parts 17 thereof are shaped to provide the digits one to nought inclusive. Each division has a different digit and the latter designates the year or time period for which the plate is licensed. Each of the parts 16 is of a different color with respect to any of the other parts 16. Each of the parts 17 is of a different color with respect to any of the other parts 17. The part 16 of each division is of a different color from that of the part 17 from which it extends.

The carrier 14 is formed with a circular row of radially disposed slots 18. Each slot 18 is arranged between a pair of divisions 15 in proximity to the outer edge of the carrier and the latter at its axis is formed with an opening 19. Between the inner ends of the divisions 15 and the opening 19 the carrier is formed with a circular row of spaced openings 20. Each opening 20 is disposed in alignment with the lengthwise median of a division.

The opening 11 aligns with the opening 19. A pivot 21 extends through the openings 11 and 19 and is coupled to the plate and carrier, the latter revolving about the pivot. The openings 20 selectively register with opening 10. Extending through registering openings 10 and 20 is a removable holdfast means 22 for retaining or latching a division 15 within opening 5. The slots 12 and 13 are adapted to register with a pair of slots 20 and extending through the registering slots 12, 13 and 20 is a removable combined sealing, securing and license fee paid indicating device 23 for securing the carrier in its adjusted position. The device 23 includes a strap 24 having its ends connected together by a seal 25. The strap 24 has an identification means thereon, as at 26 and which is in the form of a combined letter and number. The device 23 is issued yearly to the owner of a car upon payment of the license fee required and indicates that the license fee for the year or for a period of time has been paid. It also constitutes a seal for carrier 14 after the latter has been adjusted to expose the desired yearly or period of time indicated at opening 5. The device 23 is colored on its exposed face and such color if desired may correspond to the color of the part 16 of the exposed yearly or period of time indicator.

The form of carrier shown in Figure 5 and indicated at 27 is of the same construction as carrier 14, with this exception, that the carrier 27 is formed with radially disposed resilient parts 28 provided by spaced radially disposed slits 29. Each part 28 is provided with a division 30 corresponding to a division 15. Otherwise than as stated, the form of carrier 27 corresponds to that of carrier 14.

It will be assumed that the plate is to be issued for the year 1932, then the carrier is adjusted to position that division thereof provided with the digit two for exposure at opening 5. The license fee for the year 1932 being paid by the owner and he is given a combined sealing, securing and license fee paid indicating device 23 which is positioned in the manner shown in Figures 1, 2 and 4 and sealed to the plate. At the end of 1932, the owner of the car pays a license fee for the year 1933 and is given a device 23. The device 23 issued for 1932 is removed and the carrier adjusted to expose that division thereof provided with the digit three, then device 23 issued for the year 1933 is positioned in the manner shown in Figures 1, 2 and 4 and sealed. In license plate or tags issued yearly or for a period of time, the number of the plate is of a different color from that of the outer face of the latter, the colors changing yearly. In the plate, in accordance with this invention, the colors of the plate and number of the latter do not change, but the colors of the yearly indicators, device 23, as well as the identification indicia on the latter do, that is to say, the colors of parts of one yearly indicator are different from the colors of the parts of any one of the other yearly indicators, the colors of the subsequently issued devices as well as the indicia on the indicators are not alike, and by this arrangement one can readily determine if the colors of the exposed indicators and device 23 are in accordance with the colors decided upon by the district or state issuing the license for a predetermined period. Now it will be assumed that the carrier has been adjusted without payment of the license fee, and the owner uses an old device 23, then it can be readily determined that the owner has not paid the required license fee because the color of and identification on the old device 23 do not conform to requirements.

When the plate is first issued the name and address of the owner and number of the plate are recorded. On the issuing of successive devices 23 the identification means on the latter is recorded with the original record. By this arrangement it can be readily ascertained if the owner of a particular numbered plate has paid the license fee.

What I claim is:—

1. A license tag for automotive vehicles comprising, a plate provided with a license number, an exposure opening for a selected yearly indicator and a pair of spaced slots, and an adjustable disc positioned at the rear of and revolubly connected to said plate, said disc being provided with a circular row of spaced radially disposed selectively exposable portions outset with respect to the remaining part of the disc and providing different yearly indicators, each of said portions formed of an outset inner part for extension into said opening and an outset outer part in the form of a digit extended from said inner part, said disc formed with a circular row of radially disposed slots between said portions, an identifiable, yearly license paid indicating element having portions thereof extending through the slots of said plate and a pair of slots of said row and opposing the rear face of the latter, said disc being formed with a circular row of openings, said plate being formed with an opening for selective registering with an opening of said row, and means extended through the registering openings for locking the disc in its adjusted position.

2. A license tag for automotive vehicles comprising, a plate provided with a license number, an exposure opening for a selected yearly indicator and a pair of spaced slots, an adjustable disc positioned at the rear of and revolubly connected to said plate, said disc being provided with a circular row of spaced radially disposed selectively exposable portions outset with respect to the remaining part of the disc and forming different yearly indications, each of said portions formed of an outset inner part for extension into said opening to be encompassed by the wall of the latter and with an outset outer part in the form of a digit extended outwardly from said inner part, said disc being provided with a circular row of slots and with the latter arranged between said portions, a removable identifiable yearly license paid indicating element having an intermediate portion arranged against the outer face of said plate and a pair of end portions, said end portions extending through the slots of the plate and a pair of selected slots of said row and opposing the rear face of the disc and connected together, said disc being formed with a circular row of spaced openings adjacent said inner parts, said plate being formed with an opening for selective registering with an opening of said row, and removable means extended through the registering openings for locking the disc in its adjusted position.

In testimony whereof, I affix my signature hereto.

CONWAY B. SMITH.